Feb. 9, 1937.   C. P. SHERWOOD   2,070,375
FLOW METER
Filed June 27, 1932
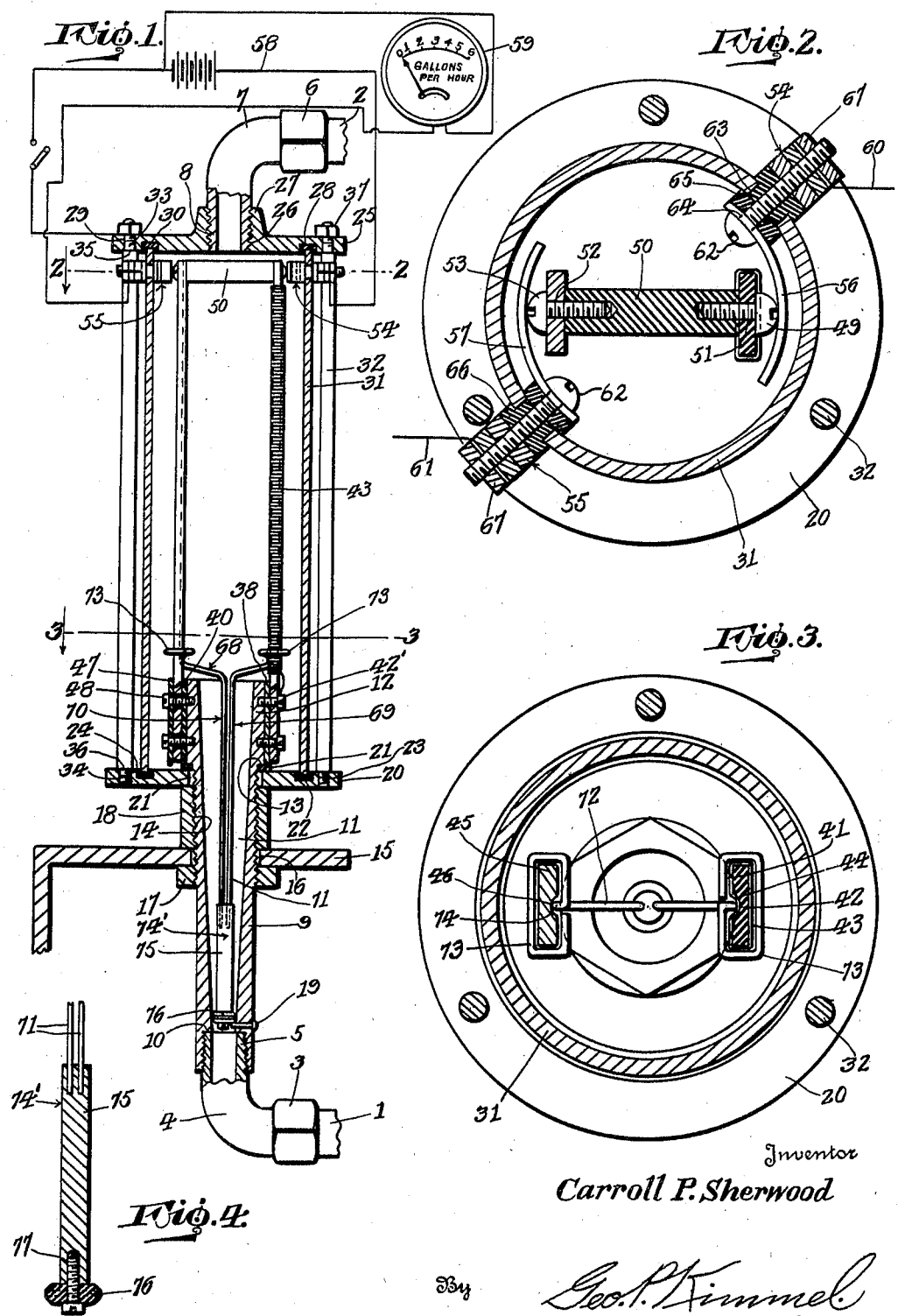
Inventor
Carroll P. Sherwood
By Geo. P. Kimmel
Attorney Patented Feb. 9, 1937

2,070,375

UNITED STATES PATENT OFFICE 2,070,375

FLOW METER

Carroll P. Sherwood, Camden, N. J., assignor to American Gasaccumulator Company, Elizabeth, N. J., a corporation of New Jersey Application June 27, 1932, Serial No. 619,589

8 Claims. (Cl. 73—209)

My invention relates to a flow meter designed primarily for use in connection with motor vehicles but it is to be understood that a flow meter in accordance with my invention may be employed in any connection for which it is found applicable.

The essential objects of my invention are to accurately indicate at all times variations in rate of fuel consumed; to control the speed of, and the pressure head required to operate meters for indicating a change in rate of, and rate of flow of fluid; to increase the speed of response to changes in rate of flow for indicating any change in rate of, and rate of flow in fluids; to decrease the pressure head required to operate the motor for indicating a change in rate of, and rate of flow in fluids; to regulate the average or relative specific density or buoyancy of a movable, fluid flow rate indicating controlling member regardless of its composition, size, shape and specific gravity, before or after immersion and upon which the fluid acts to produce a change in the position of such member in response to a change or changes in the rate of flow of the fluid whereby accurate indicating is had; to provide a solid, movable, fluid flow rate indicating controlling member having a relative density to that of the density of the fluid so as to start to lower immediately upon the decreasing of the flow a slight bit and to start to rise as soon as the flow increases a slight bit with minute pressure differential; to provide a solid, movable, fluid flow rate indicating controlling member which is instantaneously responsive to a slight decrease or increase in the flow; and to attain these ends in a strong, durable, compact, thoroughly efficient, accurately metering, and comparatively inexpensive structure.

A further object of the invention resides in an improved form of buoyant member and guiding means therefor, which cooperate for the purpose of indicating variations in rate of fuel consumed.

A further object of the invention resides in an improved form of vertically movable guiding element for the buoyant member, which is so constructed and arranged as to provide permanent contacting relation with cooperating guide members during its travel.

To the above ends essentially and others which may hereinafter appear my invention consists of such parts and combination of parts as fall within the scope of the invention as claimed.

In the drawing:

Figure 1 is a sectional elevation of the flow meter connected with and controlling the operation of an electrically operated indicator positioned at a point remote therefrom.

Figure 2 is a section on line 2—2 Figure 1.

Figure 3 is a section on line 3—3 Figure 1.

Figure 4 is a vertical sectional view of the solid buoyant flow rate indicating controlling element or member.

The device shown in the drawing is employed for controlling, at any suitable point remote therefrom, the operation of an electrical indicator for indicating at all times variations in rate of fuel consumed per hour during the travel of the fuel to a point of consumption.

Referring to the drawing 1 and 2 indicate respectively the sections of a fuel feed or conducting line. Attached to line section 1 by the coupling 3 is an upstanding elbow 4 having a peripherally threaded tapered upper end portion 5. Attached to line section 2, by the coupling 6 is an upstanding elbow 7 having a peripherally threaded, tapered lower end portion 8.

Mounted upon and threadedly engaging with the end portion 5 of elbow 4 is a metallic intake tube 9 having an internal shoulder 10. The inner diameter of tube 9 from shoulder 10 to its upper end gradually increases to provide a flared fluid intake passage 11. The upper end portion of tube 9 is laterally enlarged as at 12 to form a peripheral shoulder 13. The tube 9 intermediate its ends is formed with peripheral threads 14. A support is designated 15 and is formed with an opening 16 through which extends tube 9. A clamping nut 17 engages threads 14 and abuts one face of support 15. A clamping sleeve 18 engages threads 14 and abuts the other face of support 15.

Carried by tube 9 diametrically thereof is a stop pin 19 arranged above and in proximity to shoulder 10. The pin 19 at its inner end extends into passage 11. The flare of the passage 11 may be uniform or variable.

Seated upon the top of sleeve 18 is a bottom plate 20 preferably of circular form which is provided with a central opening 21 for the passage of the peripherally threaded portion of tube 9. The plate 20 is arranged in close proximity to shoulder 13 and interposed between the latter and plate 20 is a packing member 21. The upper face of plate 20 is provided with a circular groove 22 adjacent its outer edge. The plate 20 between groove 22 and its outer edge has a series of spaced openings 23 formed with threaded walls. A packing member 24 is arranged in groove 22.

Arranged in superposed spaced relation with respect to plate 20 is a top plate 25, corresponding in diameter to that of plate 20. The plate 25 has a central opening 26, an upstanding interiorly threaded collar 27 registering with the wall of opening 26, a circular groove 28 in its lower face adjacent its outer edge and spaced openings 29 between groove 28 and its outer edge. The openings 28 are arranged in alignment with openings 23. A packing member 30 is mounted in groove 28. The lower end portion 8 of elbow 7 extends into and threadedly engages with collar 27.

Seated in groove 22 against packing member 24 and extended into groove 28 against member 30 is a cylindrical housing 31 formed of any suitable material preferably transparent. The packing members 21, 24 and 30, plates 20, 25 and housing 31 are clamped together in a fluid tight manner by a series of tie rods 32 arranged exteriorly of housing 31. Each tie rod 32 has a reduced threaded upper end portion 33, a reduced threaded lower end portion 34, an upper shoulder 35 and a lower shoulder 36. The portion 34 threadedly engages with the wall of an opening 23, shoulder 36 seats on the upper face of plate 20, portion 33 extends upwardly through an opening 29 and shoulder 35 abuts the lower face of plate 25. The upper ends 33 of the rods 32 carry clamping nuts 37 which abut the upper face of plate 25.

Positioned against the laterally enlarged portion 12 of tube 9 is a vertically disposed metallic strip 38 and also positioned against portion 12 diametrically opposite the strip 38 is a strip 40 of insulating material. Arranged within housing 31 is a vertically disposed, narrow, comparatively thin, oblong bar 41 having centrally of its inner face a lengthwise groove 42 extending from one end to the other end thereof. The lower portion of the inner face of bar 41 is arranged against strip 38, the latter and bar 41 are fixedly secured to portion 12 by the holdfast means 42'. A resistance 43 snugly encompasses bar 41 and has its coils inset as at 44 to snugly engage the wall of groove 42. Arranged within housing 31 and disposed in parallel spaced relation to bar 41 is a conductor element in the form of a narrow, comparatively thin, oblong bar 45 having centrally of its inner face a lengthwise groove 46 extending from one end to the other end thereof. The lower portion of the inner face of bar 45 is positioned against strip 40. Arranged against the lower portion of the outer face of bar 45 is a strip 47 of insulating material. The strips 40 and 47 and bar 45 are fixedly secured to the portion 12 by holdfast means 48 which are insulated from bar 45. The bar 41 is formed of non-conducting material. One end of the resistance 43 is extended to electrically engage with a contact member 49 to be presently referred to, and the other end is secured to the upper screw 42' to provide an electrical connection with the tube 9.

Arranged between the upper ends of the bars 41, 45 is a spacing member 50 of non-conducting material. The bars 41, 45 in proximity to their upper ends have openings 51, 52 respectively. The contact member 49 is in the form of a headed screw of conducting material, extends through opening 51 and threadedly engages in one end of member 50. Passing through opening 52 and threadedly engaging in the other end of member 50 is a contact member 53 of conducting material in the form of a headed screw. The heads of members 49, 53 are spaced from the inner face of housing 31.

Carried by the housing 31 and disposed diagonally with respect to spacing member 50 is a pair of terminal elements 54, 55 carrying resilient contact pieces 56, 57 respectively permanently engaging with the contact members 49, 53 respectively. The resistance 43, conductor element 45, contact members 49, 53, terminal elements 54, 55 and contact pieces 56, 57 are interposed in the circuit 58 of a meter 59 arranged at a point remote from housing 31 for indicating at all times variations in rate of fuel consumed per hour.

The terminal elements 54, 55 are arranged at diametrically opposed points with respect to housing 31 and have attached thereto the circuit connections 60, 61 respectively of circuit 58. Each terminal element includes a headed screw 62 passing through an opening 63 in housing 31, and also through an opening 64 in proximity to an end of a contact piece. Mounted on the screw 62 and interposed between a contact piece and inner face of the housing is an insulated washer 65. The shank of the screw is insulated from the housing by a stepped washer 66 of insulation which abuts washer 65. Nuts 67 are employed for securing a circuit connection to and in electrical contact with the screw and for clamping washers 65, 66 together and a contact piece against the inner face of the head of a screw.

A vertically movable, resilient contactor element 68 is employed for electrically coupling the conductor element to the resistance when the circuit 58 is closed. The element 68 is formed of two oppositely disposed sections 69, 70 arranged in spaced relation and anchored at their lower ends in the upper end of a buoyant flow rate indicating controlling element to be hereinafter referred to. Each of said sections includes an upstanding lower end part 71, an intermediate part 72 and an upper part 73. The part 72 is disposed laterally and at an upwardly inclined direction with respect to the upper end of part 71. The part 72 of section 70 extends into the groove 46 of and contacts with bar 45. The part 72 of section 69 extends into the inset portion 44 of and contacts with resistance 43. The part 73 is of split oblong skeleton form, is horizontally disposed and has an inward extension 74 which terminates in the upper end of part 72. The part 73 of section 69 encompasses the bar 41. The part 73 of section 70 encompasses the bar 45. The parts 73 constitute guides. The part 72 of section 70 is in permanent contact with bar 45. The part 72 of section 69 is in permanent contact with resistance 43.

The buoyant flow rate indicating controlling element is indicated generally at 74', is solid and has a relative density to that of the fluid to provide an immediate responsive action thereof on the flow of the fluid. The element 74' may be made of various materials to make the same heavier or lighter to obtain any responsive action to change of flow of fluids of various viscosity and density. The element 74' comprises a metallic body part 75 and an orifice changer 76, the latter being of insulating material. The orifice changer 76 is suitably connected as at 77 to the lower end of body part 75. The latter is of uniform diameter throughout, but changer 76 is of greater diameter than that of body part 75. The diameter of changer 76 controls the area of the orifice. The element 74' is arranged and vertically movable within passage 11. The edge of the changer 76 in connection with the wall of passage 11 provides the orifice for the flow of fluid to the housing.

The pin 19 extends in the path of element 74' and abuts the changer 76 to arrest the lowering movement of such element.

As the controlling element 74' rises, the orifice changer 76 thereof gradually increases the size of the orifice for the fuel to flow through, therefore, the rate of uniform flare of the wall of passage and how fast the flare increases, governs the rapid increase in flow in proportion to the rise of changer 76, also the opposite. The changer 76 is secured concentrically to the lower end of body part 75 and has a diameter substantially equal to the diameter of a lower portion of passage 11.

Now the element 74' must not be too heavy, that is its relative density must not be too great, because it will require too great a pressure to raise it, more particularly the objection is, it would be too hard to start, and when it did start, and moved 1/64 of an inch, about a gallon per hour would be flowing through the small opening at that high pressure required to lift it, where it is only desired less than a gill to flow at that height of lift.

In many if not all cases, where the element 74' must carry some form of a contactor, electrically or otherwise or a pointer, additional weight is added to the element, which must be compensated for in some way, or the meter loses its value.

The loss in value is as follows, or the following are a few; too much pressure is required to move element 74' and in many cases where a flow meter is desired there is not sufficient pressure available.

Second, any heavy object whether submerged or not, is very sluggish, slow to get in motion, therefore slow to respond to sudden change of flow.

Third, you do not measure or indicate below a certain quantity of flow, for the pressure must be so great to raise the weight, and as soon as it raises a smallest fraction of an inch, the fluid squirts or rushes through at a great rate, and the amount is far more than the amount desired for that distance of travel of the movable member.

Now to correct these faults. It is accomplished by utilizing a solid, movable, fluid flow rate indicating controlling element having a relative density to that of the density of the fluid, so as to make such element immediately responsive to a slight decrease or increase in the flow of the fluid.

What I claim is:—

1. In a flow meter, an upright housing including a tubular body part and a pair of axially apertured top and bottom parts anchored against the ends of said body part, an outlet member secured in the axial opening of said top part, a vertically disposed fluid intake member extending upwardly through the axial opening of said bottom part, said intake member having an opening from end to end thereof of gradually increasing inner diameter from its lower portion to its upper terminus, a fluid flow rate controlling device operating in said intake member, guiding elements in said housing, connecting means between said guiding elements and said controlling device and freely movable in the opening in said intake member, and parallel guiding means outside of said intake member and within said housing for cooperating with said guiding elements to guide the movements of said controlling device.

2. In a flow meter, a housing including a tubular body part and a pair of axially apertured top and bottom parts anchored against the ends of said body part, an outlet member secured in the axial opening of said top part, a vertically disposed fluid intake member extending upwardly through the axial opening of said bottom part, said intake member being of gradually increasing inner diameter from its lower portion to its upper terminus, a fluid flow rate controlling device operating in said intake member, said intake member being formed with an outer peripheral shoulder above and in proximity to said bottom part, and a packing interposed between said shoulder and bottom part and encompassing said intake member.

3. In a flow meter, an upright housing including a tubular body part and a pair of axially apertured top and bottom parts anchored against the ends of said body part, an outlet member secured in the axial opening of said top part, a vertically disposed fluid intake member extending upwardly through the axial opening of said bottom part, said intake member having an opening from end to end thereof of gradually increasing inner diameter from its lower portion to its upper terminus, a fluid flow rate controlling device operating in said intake member, said device formed of two portions of different diameters, the portion of smallest diameter being of greater length and arranged over the portion of greatest diameter, the portion of greatest diameter corresponding in diameter to the inner diameter of the intake member in proximity to the lower end of the latter, guiding elements in said housing, connecting means between said guiding elements and said controlling device and freely movable in the opening in said intake member, and parallel guiding means outside of said intake member and within said housing for cooperating with said guiding elements to guide the movements of said controlling device.

4. In a flow meter, an upright housing including a tubular body part and a pair of axially apertured top and bottom parts anchored against the ends of said body part, an outlet member secured in the axial opening of said top part, a vertically disposed fluid intake member extending upwardly through the axial opening of said bottom part, said intake member having an opening from end to end thereof of gradually increasing inner diameter from its lower portion to its upper terminus, a fluid flow rate controlling device operating in said intake member, said device formed of two portions of different diameters, the portion of smallest diameter being of greater length and arranged over the portion of greatest diameter, the portion of greatest diameter corresponding in diameter to the inner diameter of the intake member in proximity to the lower end of the latter, means for detachably connecting the said portions of said device together, guiding elements in said housing, connecting means between said guiding elements and said controlling device and freely movable in the opening in said intake member, and parallel guiding means outside of said intake member and within said housing for cooperating with said guiding elements to guide the movements of said controlling device.

5. In a flow meter, an upright housing including a tubular body part and a pair of axially apertured top and bottom parts anchored against the ends of said body part, an outlet member secured in the axial opening of said top part, a vertically disposed fluid intake member extending upwardly through the axial opening of said bottom part, said intake member having an opening from end to end thereof of gradually increasing inner diameter from its lower portion to its upper terminus, a fluid flow rate controlling device operating in said intake member, said device formed of two portions of different diameters, the portion of smallest diameter being of greater length and arranged over the portion of greatest diameter, the portion of greatest diameter corresponding in diameter to the inner diameter of the intake member in proximity to the lower end of the latter, a stop within the lower part of the intake member arranged in the path of that portion of greatest diameter of said device, guiding elements in said housing, connecting means between said guiding elements and said controlling device and freely movable in the opening in said intake member, and parallel guiding means outside of said intake member and within said housing for cooperating with said guiding elements to guide the movements of said controlling device.

6. In a flow meter, an upright housing having a fluid inlet in its lower end and a fluid outlet in its upper end, a tubular member projecting into said housing from said inlet and having a bore increasing in diameter from its lower end toward its upper end, a weight member movable longitudinally in said tubular member, a metering disc secured to said weight member for moving the same into different positions in response to variations in the rate of flow of the fluid through said tubular member, oppositely arranged guide members extending longitudinally in said housing, guiding elements within said housing and in movable engagement with said guide members, and connecting means for securing said guiding elements to said weight member.

7. In a flow meter, an upright housing having a fluid inlet in its lower end and a fluid outlet in its upper end, an upright tubular member projecting into said housing from said inlet and having a bore increasing in diameter from its lower end toward its upper end, an orifice changing member movable longitudinally in said tubular member and comprising a cylindrical weight member freely movable in said tubular member and a metering disc secured upon said weight member and having a diameter slightly greater than the diameter of the weight member and substantially equal to the diameter of the lower end of said bore, stop means for positioning said metering disc at a distance from the lower end of said bore when at the limit of its downward movement, oppositely arranged guide members extending longitudinally within said housing, and guiding elements connected to said weight member and cooperatively engaging with said guide members for controlling the movements of said metering disc.

8. In a flow meter, an upright housing having a fluid inlet in its lower end and a fluid outlet in its upper end, a tubular member projecting into said housing from said inlet and having a bore increasing in diameter toward its upper end, an orifice changing member freely movable longitudinally of said bore in response to changes in the rate of flow of the fluid through said bore, oppositely arranged, parallel guide members within said housing, guiding elements in movable engagement with said guide members, and connecting means for securing said guiding elements to said orifice changing member.

CARROLL P. SHERWOOD.